Patented Jan. 17, 1950

2,494,592

UNITED STATES PATENT OFFICE 2,494,592

PROCESS OF TREATING SYNTHETIC POLYMERS WITH PHOSPHORUS AND SULFUR AND PRODUCTS OBTAINED THEREBY

William H. Smyers, Westfield, and David W. Young, Roselle, N. J., assignors to Standard Oil Development Company, a corporation of Delaware No Drawing. Application May 19, 1945, Serial No. 594,793

10 Claims. (Cl. 260—79.5)

This invention relates to novel chemical products and to methods of preparing and using same, and more particularly, it relates to the treatment of high molecular weight copolymers, of which a styrene-isobutylene copolymer is one example, with a phosphorizing agent alone or in conjunction with a sulfurizing treatment. The invention may be illustrated by the $P_2S_5$-treatment of a styrene-isobutylene copolymer, and the use of the resultant product as an additive in lubricating oils.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C. such as —10° C., —50° C., —80° C., —100° C., or even lower, in the presence of an active halide polymerization catalyst, and preferably in the presence of an inert, volatile organic liquid serving as solvent and refrigerant.

Instead of styrene, other polymerizable cyclic material may be used such as alphamethyl styrene, p-methyl styrene, alphamethyl p-methyl styrene, namely p-methoxy styrene, p-ethoxy styrene, dihydronaphthalene, 1-vinyl 4-methoxy naphthalene, indene, terpene, coumarone, etc., as well as copolymers of indene and coumarone, as well as other compounds such as anethole (1-isopropenyl 4-methoxy benzene), safrole (1-isopropenyl 3,4-methylene dioxybenzene).

Instead of isobutylene, other isolefins may be used such as isoamylene, particularly methyl-2 butene-2, isooctylene, etc., as well as other aliphatic olefins such as propylene, normal butylene, etc.

The proportions in which the styrene or other polymerizable cyclic material and the isobutylene or other aliphatic olefin material may be copolymerized may vary over a wide range from 1% to 50% or 90% or even 99% of the polymerizable cyclic constituent. In fact, an even smaller amount of such cyclic material may be used such as even 0.1% or less, it being sufficient to merely have 1 or 2 molecules of the styrene or other polymerizable cyclic material combined into a relatively long chain of isobutylene or other aliphatic olefin, the aromatic nucleus of the styrene serving as a chemical means by which the high molecular weight resultant copolymer may be subjected to the subsequent chemical reaction according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to stybutene, although it is not to be limited thereto.

The copolymer to be used may also be a tripolymer of a polymerizable cyclic compound, an olefinic compound and a small amount, between 0.1% to 30% or so, preferably 0.5% to 10% of a diolefin or triolefin, e. g., isoprene, butadiene, etc. One example of such a tripolymer is one comprising about 50% of isobutylene, 47% of styrene and 3% of isoprene, in the combined state.

If the products of this invention are to be used as lubricating oil additives, it is preferred to use as starting material a copolymer containing less than about 40% by weight of polymerizable cyclic compound, especially in the case of copolymers having V. I. (viscosity index)-improving properties, as will generally be indicated by an intrinsic viscosity greater than 0.3. In the case of copolymers having higher combined cyclic content, and having little or no solubility in paraffinic or other lubricating oils, they may be first solubilized by suitable chemical treatment such as by alkylation, e. g., by Friedel-Crafts reaction with an alkyl halide such as amyl chloride or with an olefin such as isobutylene or amylene, or acylation with a mono or dibasic acylating agent, e. g., stearyl chloride, sebacyl chloride, etc., or by condensation with a polyhalohydrocarbon such as dichlor hydrocarbon, e. g., ethylene dichloride or a chlorinated paraffin wax containing 10 to 15% or so of chlorine. Both this latter type of condensation and the acylation mentioned previously are especially useful for imparting pour depressing properties to the copolymer being treated.

It is also preferred, particularly when the resultant products are to be used as lubricating oil additives, to use copolymers of relatively low unsaturation, e. g., having an iodine number of less than 50, and preferably less than 20. For instance, the tripolymer example mentioned hereinabove, made with 50% of isobutylene, 47% of styrene, and 3% of isoprene has an iodine number of about 8, and is satisfactory for the purposes of this invention.

Now, according to the primary feature of this invention, any one of the above described copolymers, or mixtures thereof, are subjected to chemical treatment by phosphorizing alone, or in conjunction with sulfurizing, the chemical treatment either being carried out only to a slight extent, in order to make a slightly modified copolymer plastic, which may range in texture from a hard, solid, and even brittle resin to a tough, flexible film-forming or mouldable plastic or even a viscous liquid, or to a greater or more severe extent in order to impart extreme pressure lubricating, or anti-oxidant, or other valuable properties to the copolymer.

This chemical treatment may be carried out in a number of different ways. For instance, for phosphorizing alone, the treating agent may comprise either elemental phosphorus or a phosphorizing compound such as a phosphorus oxyhalide, e. g., $POCl_3$, $POBr_3$, etc., phosphorus pentoxide $P_2O_5$, etc., or mixtures thereof. A preferred class of treating agents is one comprising phosphorus and also an element of the sulfur family which includes sulfur, selenium, and tellurium. Such an agent, which may be considered as of the P.Y type where Y is a member of the sulfur family, may consist of a simple mixture of for instance, phosphorus or sulfur, or a compound of these two elements, e. g., $P_2S_5$, $P_4S_3$, $P_2S_3$, $P_4S_7$, $P_2Se_5$, etc., or mixtures of such compounds with either or both of the individual elements.

Another preferred class of treating agents may be considered of the P.Y.X type, where Y is the same as above, and X represents halogen. Examples of such agents include: $PSCl_3$, $PSBr_3$, $PSFBr_2$, $PSF_2Br$ and $P_2S_3Br_4$. Such agents may readily be made by reacting the appropriate phosphorus halide with hydrogen sulfide; for instance, $PSBr_3$ is made from $PBr_5$ and $H_2S$. A still further type of treating agent is one of the P.O.Y type, where Y has the same meaning as above, as in the compound $P_4O_6S_4$. Mixtures of any of the above types of treating agents may be used.

Another modification of the invention comprises first sulfurizing the copolymer and then phosphorizing it. In such a case, the sulfurizing may be effected by heating the copolymer alone or together with a suitable solvent, e. g., carbon disulfide, with elemental sulfur, or by reacting with a sulfurizing compound of the Y.X type, where Y and X have the same meanings as above, as in the case of sulfur monochloride $S_2Cl_2$, sulfur dichloride $SCl_2$, sulfur monobromide $S_2Br_2$, etc. The subsequent phosphorizing treatment may then be carried out by treating with elemental phosphorus or a phosphorizing compound such as $POCl_3$, $POBr_3$, $PCl_3$, $P_2S_5$, $P_2O_5$, etc. or mixtures thereof.

A still further modification of the invention comprises first sulfonating the copolymer as by treatment with fuming sulfuric acid of 5 to 20% fuming concentration, at relatively mild temperatures, or by commercial, concentrated sulfuric acid, or even weaker acid, at higher temperatures, and in higher proportion to the amount of copolymer treated. The resultant sulfonated copolymer is then phosphorized in the same manner as described above for the treatment to follow a sulfurizing step.

In carrying out the above described chemical treatment, the amount of treating agent will of course vary, depending upon the types of copolymer and treating agent used, and the extent of chemical modification desired, but normally, will range from about 0.1 to 5% by weight of treating agent based on the weight of copolymer treated. The temperature of reaction will of course also vary inversely with the strength and amount of treating agent, and extent of modification desired, but normally will range from about room temperature to about 250° C. or so, generally about 100 to 200° C.

The reaction is also preferably carried out in the presence of an inert liquid serving as solvent and/or a diluent such as paraffinic hydrocarbons e. g., petroleum ether or refined higher boiling fractions such as naphtha, kerosene, gas oil, or lubricating oil.

After the treatment with a phosphorus sulfide, or other treating agent described above, the reaction mixture should be filtered and distilled, or otherwise treated if necessary, to remove any volatile solvent, and if desired, the product may be neutralized or partially neutralized with a basic metal neutralizing agent such as one of the following metals in finely-divided form: Calcium, barium, magnesium, aluminum, tin, nickel, cobalt, sodium, potassium, etc., or oxides, hydroxides, carbonates, or other suitable compounds of such metals. After such neutralization, the final product should be filtered to remove unreacted neutralizing agent.

Another important modification of the invention is carrying out the above described chemical treatment of a copolymer, in the presence of a fatty oil such as one or more of the various vegetable oils e. g., soybean oil, linseed oil, cottonseed oil, or animal oils e. g., lard oil, etc., or fish oils, e. g., whale oil, sperm oil, etc. When thus phosphorizing the copolymer in the presence of a fatty oil such as those described above, it is believed that not only are the copolymer and fatty oil each separately phosphorized, but also it is believed that there is some co-reaction between these materials so that either some condensation of the fatty oil with the copolymer takes place through the medium of the phosphorizing treatment, either alone or in conjunction with the sulfurizing treatment, or in any event, the resultant product is considered to be more stable and more effective than if the materials were separately treated and then mixed together alone or added to a lubricating oil.

A preferred method of carrying out the invention when the treated products are to be used as lubricating oil additives, is to carry out the chemical, e. g., phosphorizing, treatment of the copolymer while dissolved in a portion of a lubricating oil, so as to make a concentrate of the treated product, which can then readily be diluted with further amounts of lubricating oil, to make a lubricant of the desired final composition. In such a case, the concentrate may advantageously contain from 1 to 50%, preferably about 5 to 30% of the treated copolymer, and the finished blend should ordinarily contain an amount of treated polymer ranging from about .01% to about 10%, preferably about 0.1 to 5.0%.

One advantage of the present invention is the presence of aromatic or other cyclic nuclei chemically combined in a hydrocarbon copolymer having a molecular weight ranging from the dimer or trimer stage, but preferably from about 500 to 10,000 or 100,000 or more, and another advantage is that the type of reaction and the nature of the finished products may be varied and controlled at will by varying the proportion of aromatic and aliphatic constituents used in making the copolymers, and by controlled variation of the temperature of the copolymerization. For instance, for a product having relatively high viscosity index-improving properties and relatively low cyclic content in the copolymer, one may use for instance from 1% to 30% or so of styrene with 90 to 70% respectively, of isobutylene, and the copolymerization should be preferably carried out at a temperature at least as low as —70° C. On the other hand, for products of lower molecular weight, higher cyclic content and lower viscosity index-improving characteristics, one may use larger amounts of styrene, e. g., from 30 to 50% or more, and the copolymerization may be carried out either at the low temperature described or at higher temperatures ranging up to —20° C. or up to about 0° C.

Thus, the products of this invention are essentially cyclic-aliphatic copolymers containing phosphorus or containing both phosphorus and a member of the sulfur family. These products are quite different from those obtained by similar chemical treatment of purely aliphatic polymers, because the aromatic or other cyclic groups present in the copolymers used in this invention are readily susceptible to the particular chemical treatments involved, and facilitate the inclusion of phosphorus alone or together with sulfur in the product, and also, the resultant products differ in chemical characteristics by reason of having phosphorus alone or with sulfur attached to the cyclic nuclei, in addition, of course, to some which are also attached to the aliphatic portions of the copolymer molecules. These products are useful as modified plastics, as they have better solubility in, or compatibility with various types of materials such as: polybutene, copolymers of isobutylene and diolefins, polybutadiene, polystyrene, polyethylene, etc. For use as an additive for mineral lubricating oils or other petroleum fractions such as kerosene, naphtha, paraffin wax, asphalt, etc., the treated products are particularly advantageous because they are polyfunctional in nature and possess antioxidant properties, extreme-pressure lubricating properties, viscosity index-improving properties, and in some instances, also pour depressing properties.

The advantages and details of the invention will be better understood from a consideration of the following experimental data.

*Example 1*

A mixture of styrene and isobutylene containing about 15% of styrene was copolymerized at about —30° C., using 15 parts by weight of AlCl$_3$-methyl chloride solution as catalyst and using 3 volumes of methylchloride diluent per volume of mixed reactants, and the resultant copolymer, after washing with water and heating to about 180° F. to remove solvent and water, was found to have a molecular weight of about 12,000 and a chemical analysis showed 86.64% carbon and 13.36% hydrogen, indicating that the copolymer contained about 14.2% of combined styrene. This copolymer had an intrinsic viscosity of about 0.4 and had substantial viscosity index-improving properties.

The above described copolymer was then dissolved in 10% concentrate in a paraffinic mineral lubricating oil having a viscosity of about 52 sec. Say. Univ. at 210° F. and a viscosity index of 100. 5% by weight of P$_2$S$_5$ was then added to the resulting solution, and the mixture was heated at about 150 to 180° C. for 30 minutes. The solution was cooled to room temperature and filtered through a layer of Hiflo aid on paper. The clear solution was analyzed and found to contain 2.11% S and 0.74% P. Viscosity tests indicated that the clear blend containing about 10% of P$_2$S$_5$-treated styrene-isobutylene copolymer, had a viscosity of 79 sec. Say. Univ. at 210° F., and a viscosity index of 132. E. P. (extreme pressure) lubricating tests on the Almen machine indicated that the blend was able to carry the full load (15 weight) with gradual loading.

*Example 2*

Another stybutene copolymer having a combined styrene content of about 20% and having an average molecular weight of about 15,000 was dissolved in 5% concentration in toluene, and was treated with 5% of P$_2$S$_5$ by the procedure of Example 1, using a reaction temperature of about the boiling point of toluene for about 30 minutes. After a filtration step, the treated copolymer was removed from the toluene solution by the evaporation off of solvent and the residual polymer was found to contain 2.6% S and 0.8% P.

*Example 3*

30 g. of stybutene having a combined styrene content of about 39% and made at a temperature of about —50° C. with a catalyst consisting of about 0.8% of aluminum chloride dissolved in methyl chloride, was dissolved in 200 ml. of toluene. Then 10 g. of P$_2$S$_5$ was added, and the mixture was heated ½ hour under reflux at the boiling point of toluene. The mixture was cooled to room temperature and filtered through paper to remove unreacted P$_2$S$_5$. The clear filtrate was then placed on a hot water bath to evaporate the solvent. When all of the toluene had been removed the polymer was found to be soluble in mineral oil with 98 viscosity index and 52 sec. Say. Univ. at 210° F., and chemical analysis of the treated copolymer showed 2.26% S and 1.12% P.

*Example 4*

30 g. of a stybutene similar to that used in Example 3, but which had been sulfated in carbon tetrachloride solution with fuming sulfuric acid, was dissolved in 200 ml. of toluene. 10 g. of P$_2$S$_5$ was added, and the mixture was heated at the boiling point of the toluene for one hour. After this, the mixture was cooled to room temperature, filtered and the solvent removed by heating. The P$_2$S$_5$-treated sulfonated styrene-isobutylene copolymer was found to be soluble in the same paraffinic mineral oil used in Example 3 and chemical analysis of this product showed 3.26% S and 0.91% P. Tests indicated that the P$_2$S$_5$-treated sulfonated polymer when blended in a mineral oil that had 43 sec. Say. Univ. at 210° F. and a viscosity index of 114 gave a polymer blend that had a viscosity index of 131 and an S. S. U. at 210° F. of 58. The percent polymer present in oil was about 1.3% by weight.

It is not intended that this invention be limited to the specific examples which have been given merely for the sake of illustration, but only by the appended claims in which it is intended to claim all modifications coming within the scope and spirt of the invention.

What is claimed is:

1. Process which comprises reacting a copolymer of about 15 to 40% by weight of a polymerizable mono-olefinic aromatic compound containing 8 to 13 carbon atoms of which 6 to 10 are part of the aromatic nucleus and of about 85 to 60% of an aliphatic mono-olefin of 3 to 8 carbon atoms, said copolymer having a molecular weight of about 1000 to 100,000, with about 0.1 to 5% by weight of a reagent comprising phosphorus and also comprising sulfur, at a reaction temperature between about room temperature and 250° C., to incorporate a substantial amount of both phosphorus and sulfur into the copolymer.

2. Process which comprises reacting a copolymer, of about 15 to 40% by weight of a polymerizable mono-olefinic aromatic hydrocarbon having 8 to 10 carbon atoms of which 6 constitute a benzene ring, and of about 85 to 60% of an aliphatic isoolefin having 4 to 5 carbon atoms, said copolymer having a molecular weight of about 1000 to 100,000, with about 0.1 to 5% by weight of a reagent consisting essentially of a phosphorus sulfide, at a reaction temperature of about 100 to 200° C., in the presence of a diluent, and filtering the reaction mixture after the reaction has been completed.

3. Process which comprises reacting a styrene-isobutylene copolymer containing about 15 to 40% by weight of combined styrene, and having a molecular weight of about 1000 to 100,000, with about 0.1 to 5% by weight of $P_2S_5$ in the presence of a volatile inert solvent, at a reaction temperature of about 100 to 200° C., filtering the reaction mixture, and distilling off the volatile inert solvent.

4. Process according to claim 3 in which the styrene-isobutylene copolymer has a molecular weight of about 10,000 to 15,000.

5. Process for preparing a polyfunctional derivative of a hydrocarbon copolymer, which comprises dissolving about 5% of a styrene-isobutylene copolymer having an average molecular weight of about 15,000 and having a combined styrene content of about 20%, in toluene, treating the resulting solution with 5% of $P_2S_5$ by heating the mixture at about 150 to 180° C. for thirty minutes, cooling the reaction mixture to room temperature and filtering through a filter aid, and evaporating the toluene to leave a residual polymer reaction product containing about 2.6% sulfur and 0.8% phosphorus.

6. Product comprising a phosphorus- and sulfur-containing copolymer of about 15 to 40% by weight of a polymerizable mono-olefinic aromatic compound containing 8 to 13 carbon atoms of which 6 to 10 are part of the aromatic nucleus and of about 85 to 60% of an aliphatic mono-olefin of 3 to 8 carbon atoms, said copolymer having a molecular weight of about 1000 to 100,000.

7. A phosphorus sulfide treated copolymer of about 15 to 40% by weight of a polymerizable mono-olefinic aromatic hydrocarbon having 8 to 10 carbon atoms of which 6 constitute a benzene ring, and of 85 to 60% of an aliphatic iso-olefin of 4 to 5 carbon atoms, said copolymer having a molecular weight of about 1000 to 100,000, said product containing a small but substantial amount of both phosphorus and sulfur.

8. A phosphorus sulfide treated styrene-isobutylene copolymer having a combined styrene content of about 15 to 40% by weight, and a molecular weight of about 1000 to 100,000, said product containing about 2.1 to 3.2% of sulfur and about 0.7 to 1.1% of phosphorus, and being soluble in hydrocarbon oils.

9. A $P_2S_5$-treated styrene-isobutylene copolymer having a combined styrene content of about 15 to 40% by weight and having a molecular weight of about 10,000 to 15,000, said product containing about 2.1 to 3.2% of sulfur and about 0.7 to 1.1% of phosphorus, soluble in hydrocarbon oils and having anti-oxidant properties.

10. A $P_2S_5$-treated styrene-isobutylene copolymer having a combined styrene content of about 20% and having an average molecular weight of about 15,000, said product containing about 2.6% of sulfur and about 0.8% of phosphorus.

WILLIAM H. SMYERS.
DAVID W. YOUNG.

REFERENCES CITED

The following references are of record in the file of this patent:

UNITED STATES PATENTS

| Number | Name | Date |
|---|---|---|
| Re. 22,464 | Kelso | Apr. 4, 1944 |
| 2,213,423 | Wiezevich | Sept. 3, 1940 |
| 2,316,085 | Kelso | Apr. 6, 1943 |
| 2,375,572 | Martin | May 8, 1945 |
| 2,386,968 | Martin | Oct. 16, 1945 |
| 2,406,575 | Young et al. | Aug. 27, 1946 |